(12) United States Patent
Ehrenleitner

(10) Patent No.: US 11,261,905 B2
(45) Date of Patent: Mar. 1, 2022

(54) VIRTUAL SWIVEL DEVICE WITH MOVEMENT LIMITATION

(71) Applicant: EB-invent GmbH, Altensteig-Walddorf (DE)

(72) Inventor: Franz Ehrenleitner, Altensteig-Walddorf (DE)

(73) Assignee: EB-invent GmbH, Altensteig-Walddorf (DE)

( * ) Notice: Subject to any disclaimer, the term of this patent is extended or adjusted under 35 U.S.C. 154(b) by 296 days.

(21) Appl. No.: 16/424,312

(22) Filed: May 28, 2019

(65) Prior Publication Data

US 2019/0383324 A1     Dec. 19, 2019

(30) Foreign Application Priority Data

Jun. 14, 2018   (DE) .......................... 102018114207.2

(51) Int. Cl.
*A47C 3/026* (2006.01)
*F16C 11/04* (2006.01)

(52) U.S. Cl.
CPC .............. *F16C 11/04* (2013.01); *A47C 3/026* (2013.01); *Y10T 403/32041* (2015.01); *Y10T 403/32557* (2015.01)

(58) Field of Classification Search
CPC ......... B25J 9/0048; B25J 9/0051; B23Q 1/54; B23Q 1/5412; Y10T 403/32557; Y10T 403/32016; Y10T 403/32041; Y10T 403/32049; A47C 3/026
See application file for complete search history.

(56) References Cited

U.S. PATENT DOCUMENTS

| | | | | |
|---|---|---|---|---|
| 2,539,066 A | * | 1/1951 | Falk ...................... | E05C 17/345 292/263 |
| 5,611,551 A | * | 3/1997 | Lin ......................... | B25H 5/00 280/32.5 |
| 7,222,832 B2 | * | 5/2007 | Welker ..................... | A47C 3/38 248/157 |
| 8,562,518 B2 | * | 10/2013 | Kitagawa ............... | A61B 1/008 600/142 |
| 2014/0001318 A1 | | 1/2014 | Ehrenleitner | |

FOREIGN PATENT DOCUMENTS

| | | | | |
|---|---|---|---|---|
| CA | 025 252 | * | 12/2017 | ............. A47C 3/026 |
| DE | 27 34 755 | * | 2/1978 | ............. A47C 3/026 |
| EP | 0 721 411 | * | 5/1997 | ............... B62D 1/19 |
| GB | 2 282 433 | * | 4/1995 | ............... F16D 3/26 |
| GB | 2 363 701 | * | 1/2002 | ............ F16M 11/12 |
| WO | 2012123102 A1 | | 9/2012 | |
| WO | 2013029069 A1 | | 3/2013 | |

* cited by examiner

*Primary Examiner* — Michael P Ferguson
(74) *Attorney, Agent, or Firm* — Raven Patents, LLC; Anton E. Skaugset

(57) ABSTRACT

A virtual device for the limited pivoting of an object about a base virtual pivot point by means of a pivoting device, where a limiting device is provided for the pivoting angle. The virtual device is a mechanically stable and yet space-saving limiting device that is rotatable about an outer axis on the base and about an outer axis (23') rotatable on the object, or on the slide, where the limiting device limits the distance and/or the angular position of the two axes relative to one another, with the proviso that the axes always occupy the same plane.

3 Claims, 8 Drawing Sheets

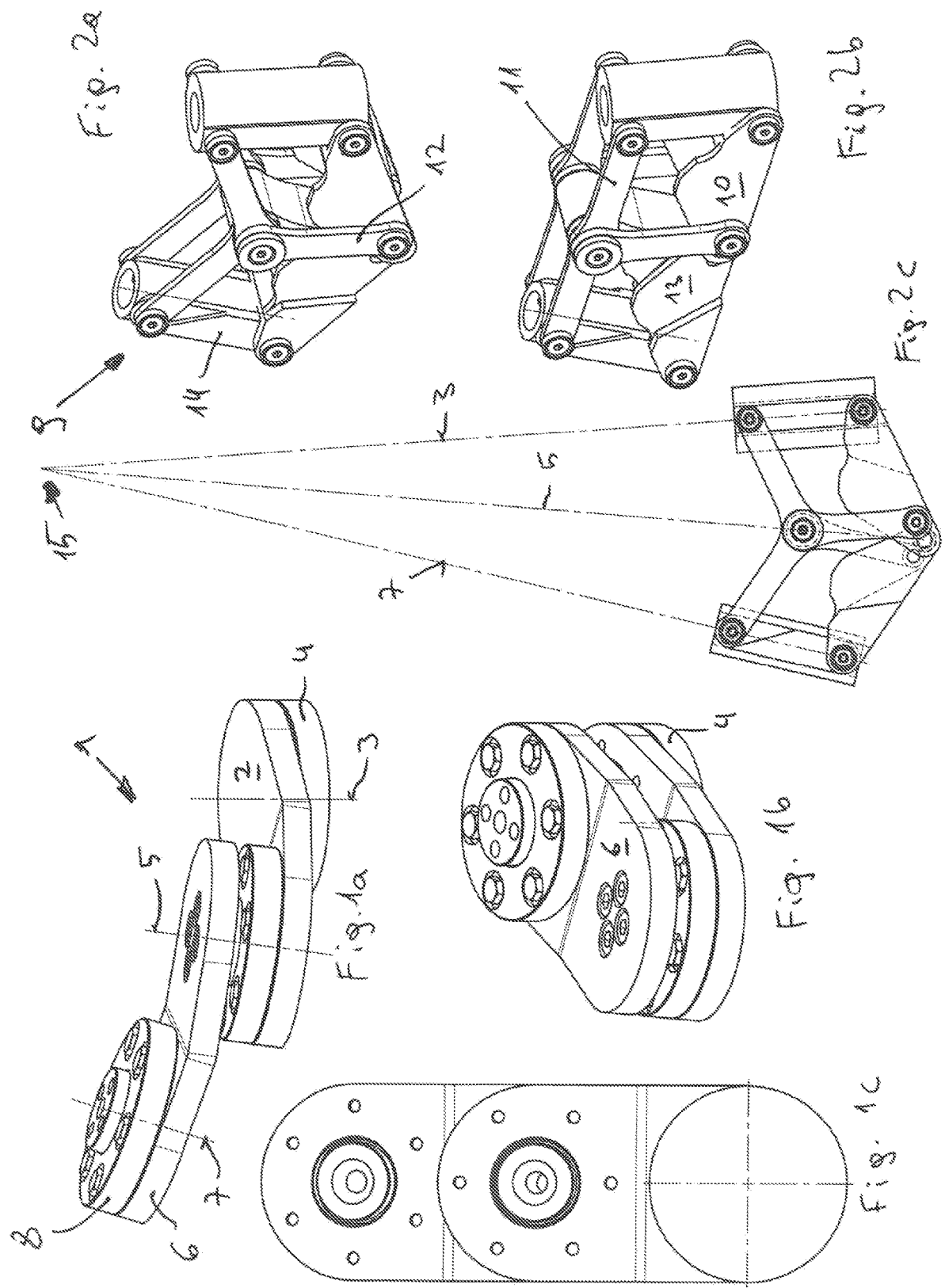

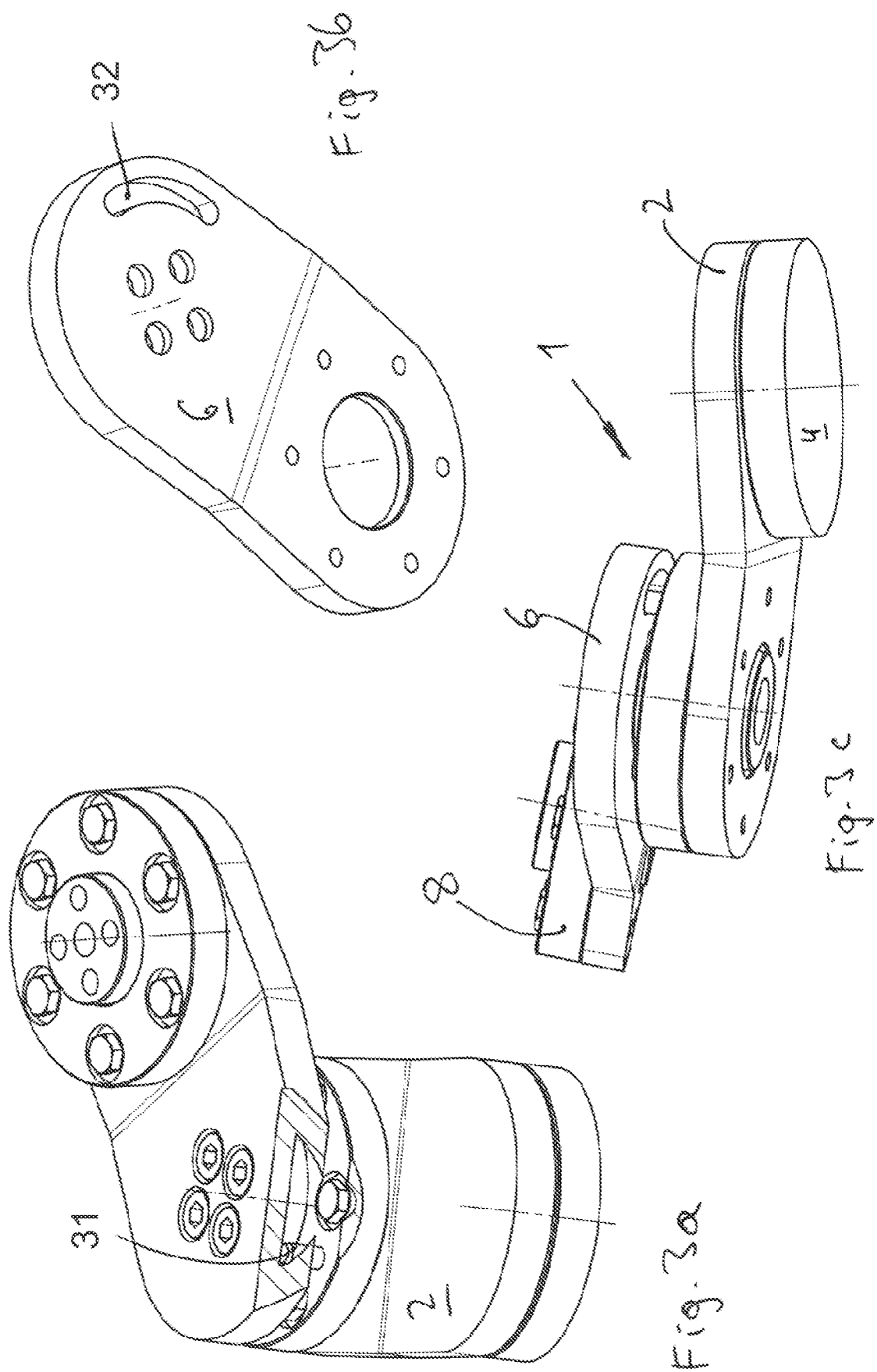

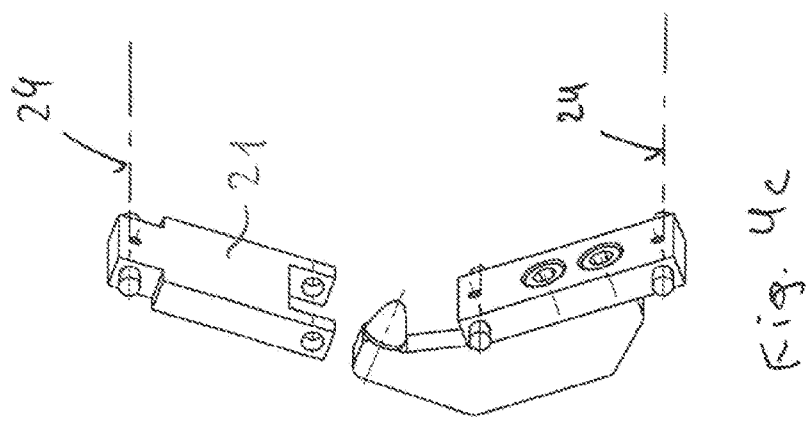
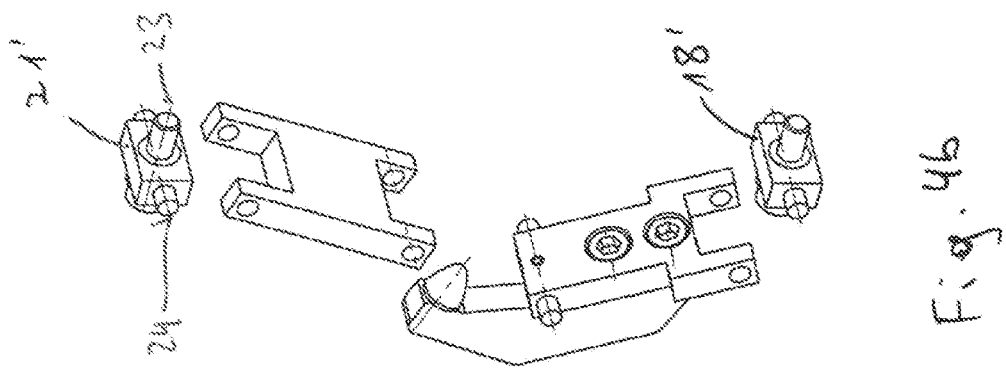
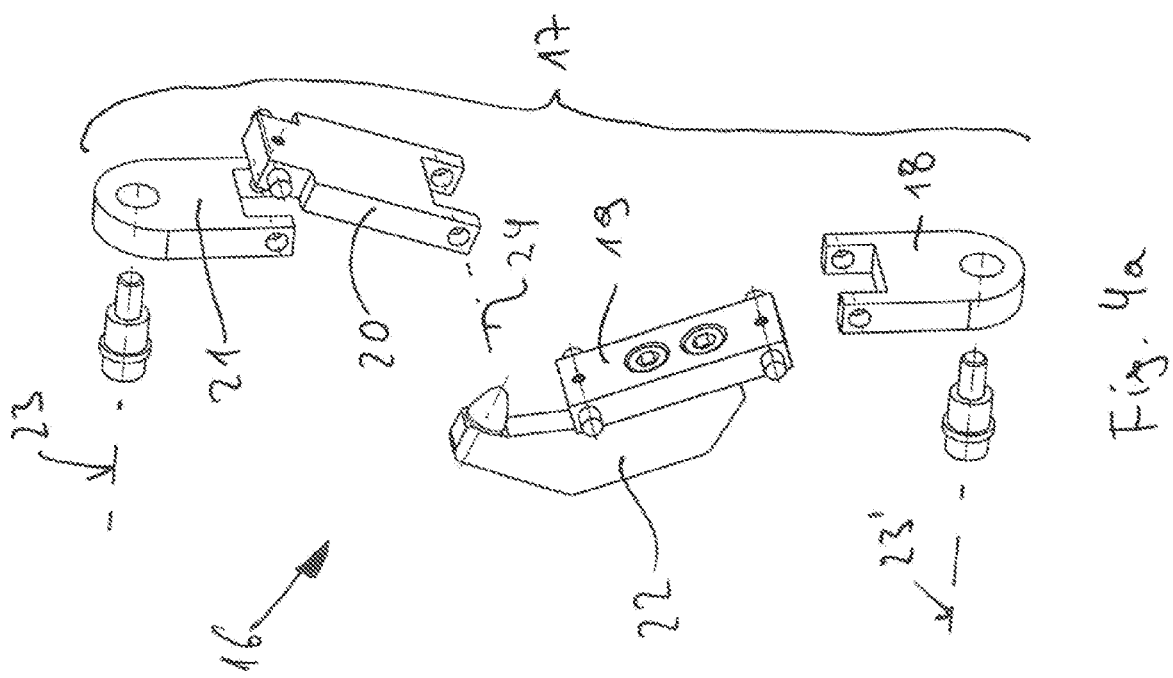

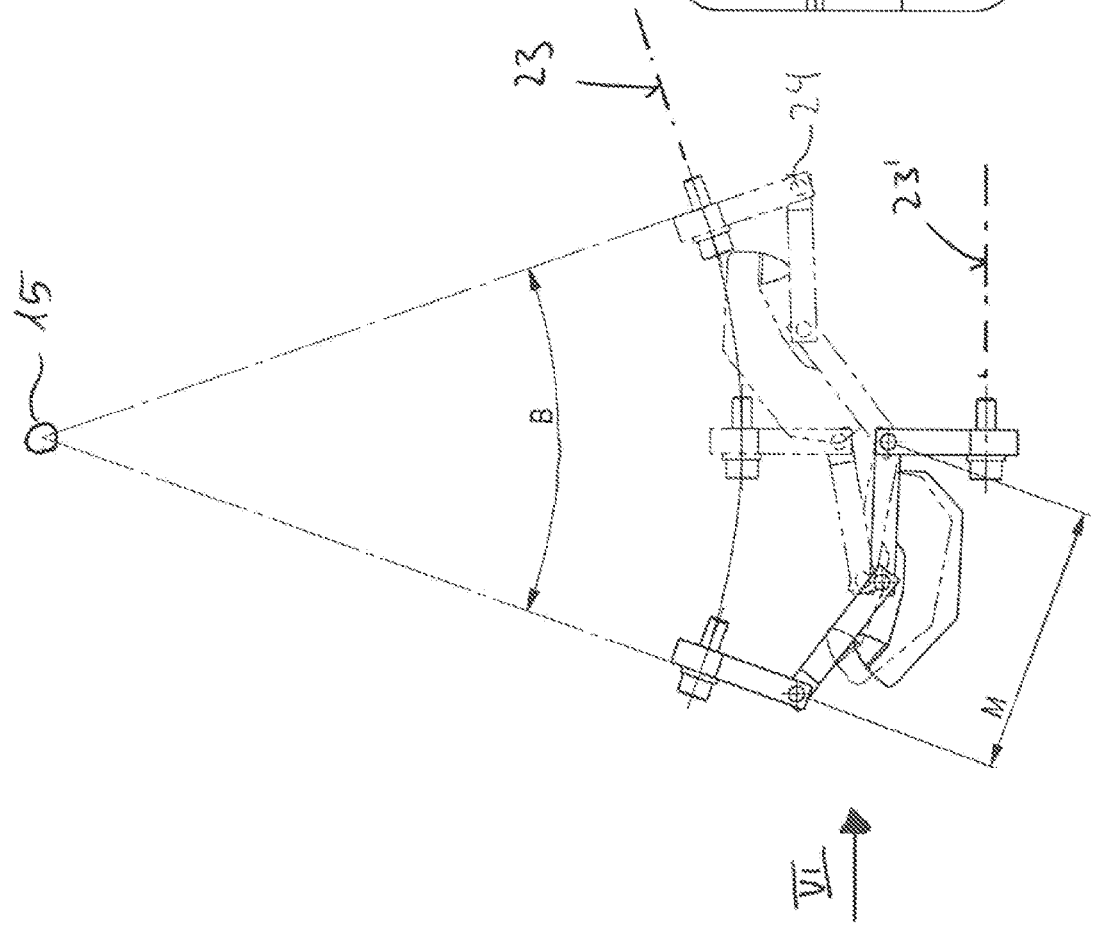

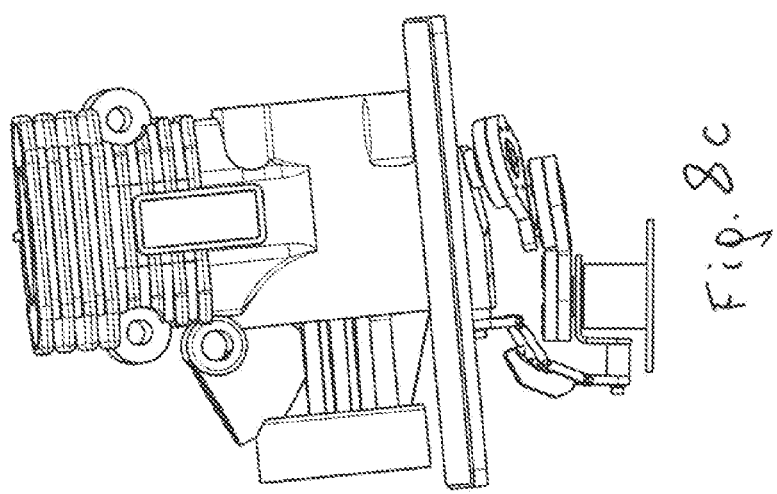
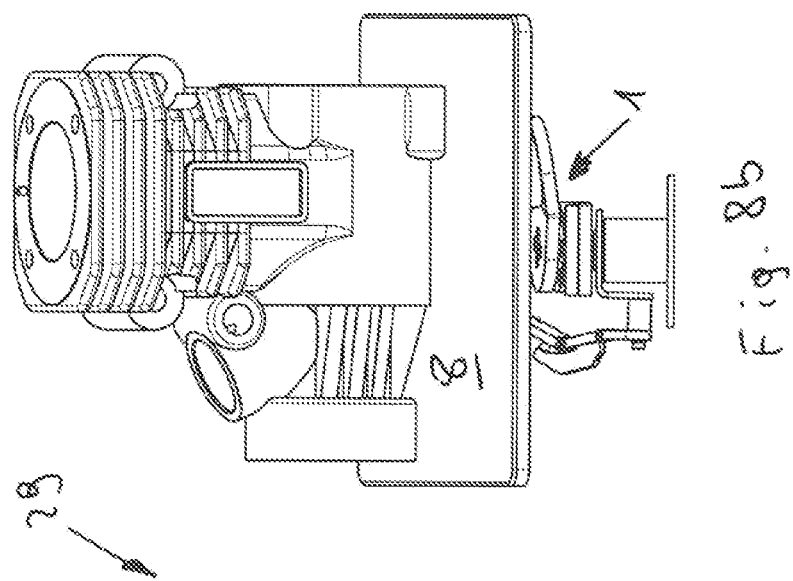
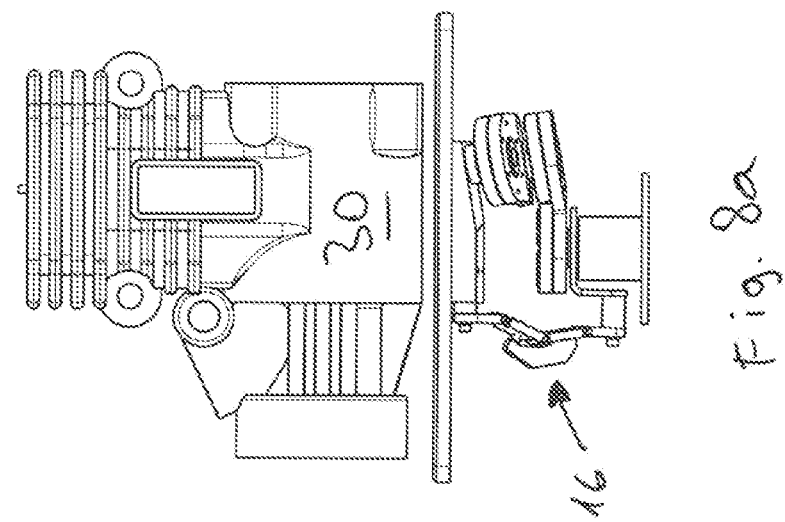

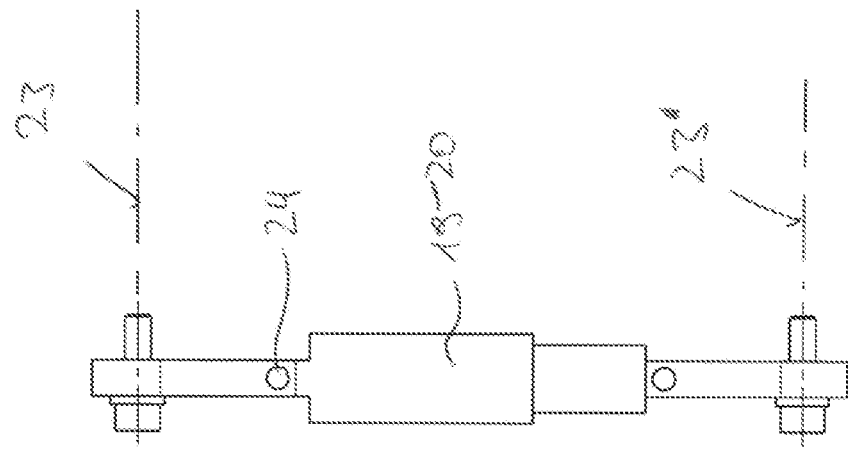
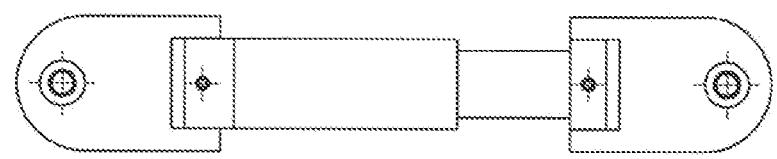
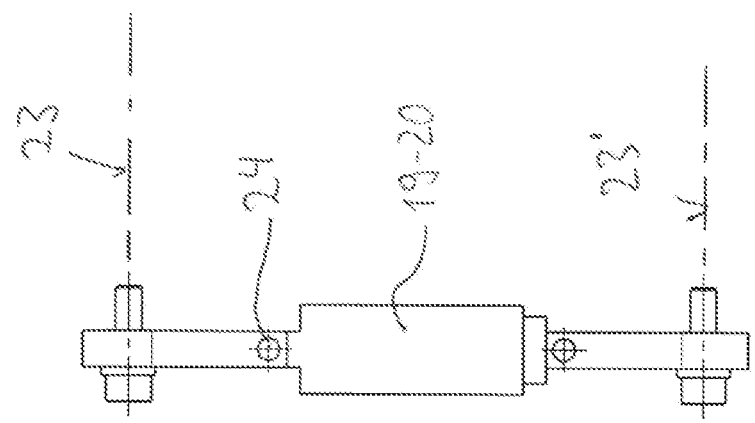
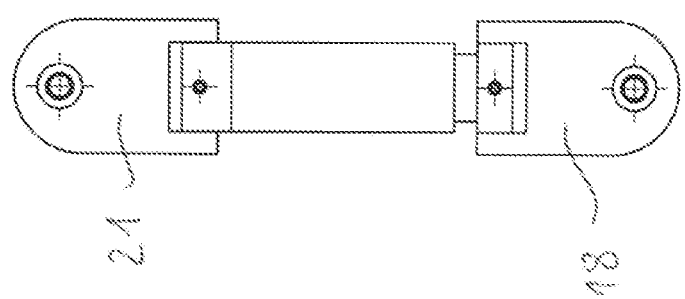

VIRTUAL SWIVEL DEVICE WITH MOVEMENT LIMITATION

TECHNICAL FIELD

The invention relates to a virtual pivot device with movement limitation of the spherical or hinge movement of an object with respect to a base about a virtual center or a virtual axis.

BACKGROUND

Various devices are known in which an object is pivotable about an axis or spherically about a point stationary with respect to a base, neither the axis nor the point being materially present, but only the storage of the article on arms or the like at the base takes place so that it moves around a point located at a distance therefrom or an axis located at a distance therefrom. Examples are WO2013/029069; WO 2012/123102, corresponding to US 2014/0001318, the content of which is incorporated herein by reference in the jurisdictions in which this is possible.

Examples of such kinematics are, for example, seating furniture, in particular office chairs, bedside tables, operating tables, but also devices for water jet cutting, painting, for carrying milling device, manipulators of all kinds and the like, where it matters that an object as a tool in the broadest sense of Word is pivoted about an operating point and does not change its distance to it. The latter is synonymous with the fact that the tool is guided along a non-planar surface under always the same angle and distance, both and especially at the end of an arm of a robot, which then forms the base disposed.

Such virtual joints are designed, for example, such that an arm is pivotable about a first joint on a base about a first axis, that a second joint is formed on this arm about which a second arm is pivotable, and finally on this second arm, about a third axis of the object (platform) is pivotally mounted with the three axes intersecting at a point, precisely with the pivot point or tools at the operating point.

Another embodiment of such a virtual joint is obtained when a four-bar linkage is rotatably arranged about a first axis, which represents the base, wherein a second four-bar linkage is arranged in the same plane as the first four-bar linkage about one of the two axes which are not articulated thereto and that the object to be rotated (platform) is rotatably mounted on the opposite coupling of this second four-bar linkage.

In both cases it is necessary and by various stops and the like to prevent that the axes take a singular position, namely either coincide or become parallel.

It is now, apart from this compelling need, in many applications, desired or even necessary to limit the extent of rotation around the virtual axis or the virtual item object. The closest solution at first sight to install appropriate stops in the components that form the kinematics, is not always possible because of the apex that occur and the usually compact design of this kinematic device. Since in application areas in which the pivot is not accessible, the rotating around this point object is difficult and is mechanically influenced only in special cases by guides such as scenes and the like, because such an interaction would have to take place in a geometric area, which is only available in a difficult manner, there is a need for a device by which a limitation of the pivoting movement in a simple, reliable, space-saving and robust manner is achieved.

It is the object and task of the invention to indicate such a device.

According to the invention, these goals are achieved by a kinematic limiting device which is fastened on the one hand to the base, on the other hand to the object to be pivoted, on both components about mutually parallel axes and allows a change in distance of the two axes to a predetermined extent. In this way one can achieve a movement of the object about a virtual axis with respect to the base.

In one embodiment, it is provided that the kinematic device also allows a pivoting of the two axes to each other, whereby these always span a plane.

BRIEF DESCRIPTION OF THE DRAWINGS

The invention will be explained in more detail below with reference to the drawing. There the FIGS. 1a-1c show or indicate a first variant of a kinematics for a virtual spherical joint, the FIGS. 2a-2c show a second variant of such a kinematic, the FIGS. 3a-3c show an embodiment according to the invention with swivel limitation within the kinematic, the FIGS. 4a-4c show a first variant of a limiting device according to the invention, the FIGS. 5a-5c the limiting effect in a first level, the FIGS. 6a-6c the limiting effect in a plane normal to that of FIG. 5, the FIGS. 7a-7f the effect when used with a chair, in the two mutually normal levels, the FIGS. 8a-8c analogous to FIG. 7 the effects when used with a manipulator and the FIGS. 9a-9d, a variant of a limiting device according to the invention.

DETAILED DESCRIPTION

Figure 5C:
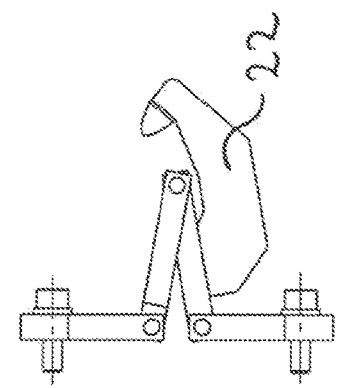

In the three views of FIG. 1 a device known from the prior art of technology for the creation of a virtual pivot point can be seen:

The total designated 1 pivoting device has a base part 2, which is hinged about a base axis 3 rotatably mounted on a base 4. On the base part 2 about an arm axis 5 an arm 6 is articulated. In turn, an object carrier 8 is mounted on this arm 6, rotatable about an object axis 7. This object carrier 8 carries the object, not shown. Since the three axes, the base axis 3, the arm axis 5 and the object axis 7 intersect each other in a single, common point (central point 15, FIG. 2), with arbitrary rotation of the base part 2, the arm 6 and the slide 8 to the each associated axes, the object fixed to the slide object is rotated together with the slide about this point of intersection pivots.

FIGS. 1b and 1c show in different views, the mobility of this kinematic device by which such a pivoting can be achieved within wide limits.

FIG. 2 shows a second kinematic pivoting device 9, which is not known from the prior art, in which a first base part 10 is fastened pivotably about an axis 3 on a base (not shown). This base part 10 forms with a base arm 11 and a coupling 12 a four-bar linkage.

On the base part 10 at a distance from the axis to which the coupling 12 is articulated, a further parallel thereto axis is provided, on which an object part 13 is pivotally articulated. This object part is analogous to the first joint quadrilateral with an object carrier another four-bar linkage.

In this way, the FIG. 2c high visible axes, a base axis 3, an arm axis 5 and an object axis 7 are spanned, which in turn intersect each other, as in the first described pivoting device in a central point 15. Due to the rotation ability of the entire pivot device 9 around the base axis 3, a spherical movement of the object, which can be rotated (not represented) with the object carrier, is achieved.

FIG. 3 shows, in three representations, the possibility of limiting the rotation of the initially mentioned pivot device by providing a pin 31 in base part 2, which cooperates with a curved recess 32 in arm 6 and thus the extent of the rotation is limited. In the same way, it is possible to limit the twisting between the base part 2 and the base 4 or arm 6 and the object carrier 8. Of course, the pivot and sets can replace the components without a kinematic change. As can be clearly seen from FIG. 3, this solution is kinematically simple, but because of the short lever arms (distance from the respective axes 3, 5 and 7) and the high forces thus occurring is not practical for cases in which the mass of the object and thus the forces are noticeable.

Similar limit stops are possible in the pivoting device according to FIG. 2.

A further limiting device 16 according to the invention, which does not have these disadvantages, can be seen from FIG. 4 in three variants in a respective perspective view.

FIG. 4a shows a variant of the limiting device 16 which has or consists of a kinematic link chain 17 which contains four parts: Namely, two edge parts 18, 21 and two central parts 19, 20. These four parts are pivotable about three mutually parallel inner axes (without distinction) 24 against each other. The edge portions 18, 21 are rotatable by means of matching joints or bearings about outer axes 23, 23', which are normal to the three inner axes 24, at the base or on the object. One of the central parts, in the example shown, the central part 19 carries a stop 22.

The two other variants of FIG. 4 will be explained later, the operation of the limiting device 16 will be described with reference to FIGS. 5 and 6.

FIG. 5 shows, in three illustrations, the pivotability of the limiting device 16 by fixation of one of the two outer axes, the axis 23' in the space: It is assumed that this axis 23' is suitably rotatably mounted on the base (not shown) of a device equipped according to the invention and the second outer shaft 23 on the object or the slide (not shown). Now, if the object is rotated about the central point 15 about an axis parallel to the outer axis 23, indicated by the angle A, so the distance between the two axes 23, 23'; changes by this pivoting movement, as shown in dashed lines. Despite this pivotal movement, the two axes remain parallel to each other and thus span a plane, synonymous with: lie in one plane.

Figure 5B:
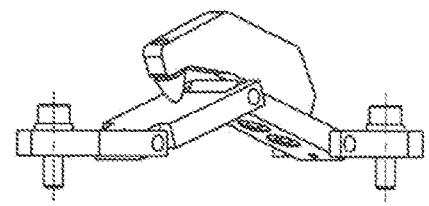

The limiting device 16 can join in this movement, since the link chain 17 performs the folding movement illustrated in the secondary FIGS. 5b and 5c, it being only necessary to take care that the shortest distance between the two axes 23, 23' is even greater than the corresponding one length of the two outer parts 18, 21 increased by the necessary length of the largely folded central parts 19, 20. If necessary, the inner axis arrangement of the parts 18-21 can be achieved by mutually offset arrangement in the direction of an even smaller degree. As can be seen from the cohesion of FIGS. 5a, b, c, the stop 22 ensures that the link chain 17 does not reach its extended position, since it has singularity in this position (all three inner axes in one plane) an loses its function.

Figure 5A:
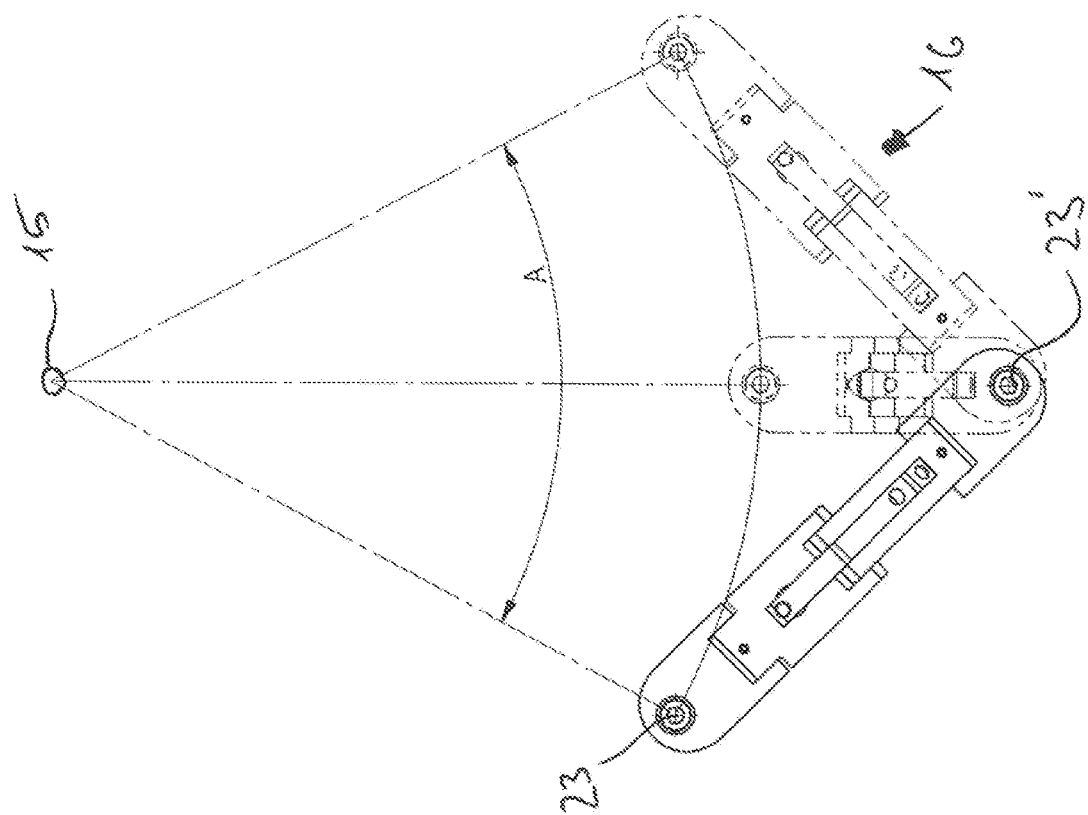
Figure 7A:
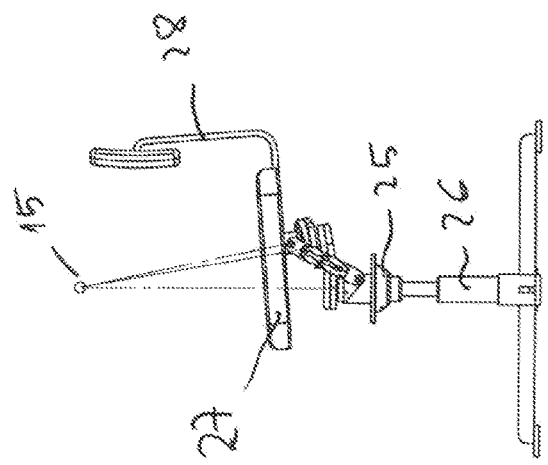
Figure 7B:
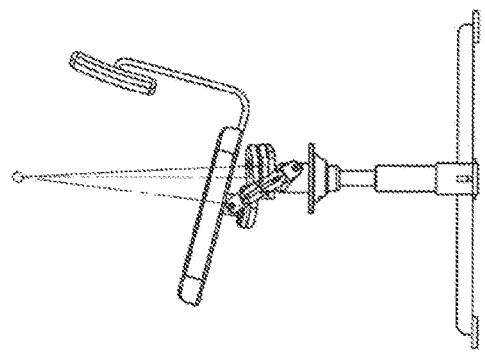
Figure 7C:
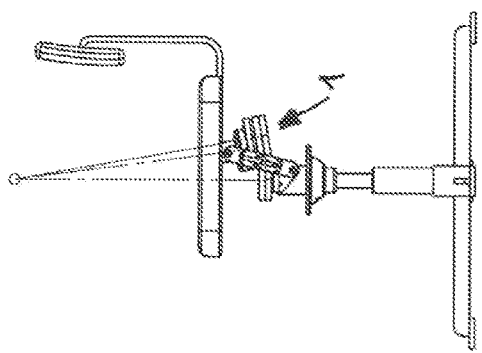
Figure 7D:
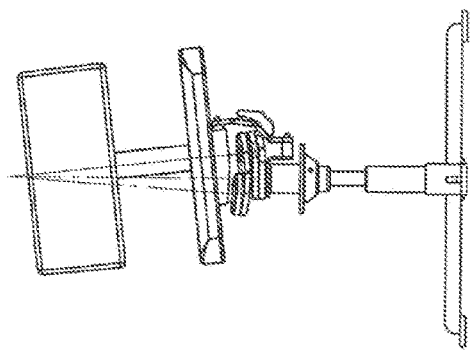
Figure 7E:
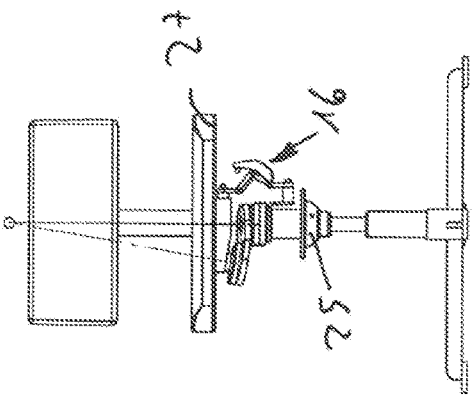
Figure 7F:
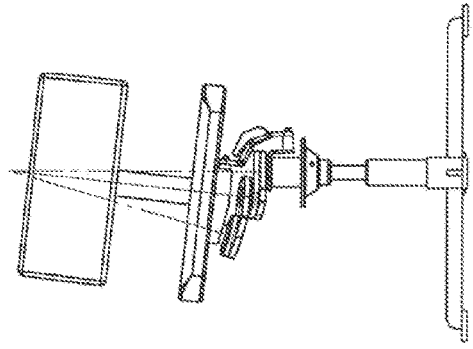

FIG. 6 shows in three views the situation in a rotated by 90° to this level, it can be seen that in this rotation of the shown in FIG. 4, parallel course of the two outer axes 23 is no longer met, but this spans a plane (=lie in one plane); and that by this change in angle pivoting about an axis normal to the pivot axis of FIG. 5a is possible. Despite this rotation by 90°, the maximum distance M, which can be achieved by the stop of the stop 22 at the associated edge portion 18, 21 results here as well. Since, as can be seen from FIG. 6a, the edge parts 18, 21 contribute nothing to the Angle B due to their radial arrangement with respect to the central point 15, this is smaller than the Angle A. FIGS. 6b and 6c show the view in the direction of Arrows VI which shows in two extreme situations maximum swing on the one hand, strongest shortening on the other hand.

These two movements about the two axis systems can now be combined in the predetermined limits, whereby the spherical movement of the object around the central point 15 in the limits prescribed by the limiting device 16 is possible. By appropriate alignment of the outer axes 23, 23' in a suitably selected basic position and corresponding inclination in a plane normal to it, it is possible to provide asymmetric pivoting possibilities. With regard to the limiting device 16, these are of course symmetrical, but the assembly of the limiting device with respect to the actual pivoting device 1 (more precisely: The base and the object) suitably oblique or eccentric. Even with a combination of these movements, the two outer axes 23, 23' always remain in one plane (=span one plane).

Back to FIG. 4b: Here, the two outer parts 18, 21 are shrunk with their associated inner and outer axes to central parts of universal joints, so that one achieves that in both planes of FIGS. 5 and 6 equal maximum angles A=B are achieved.

FIG. 4c shows a variant in which was dispensed with the two edge parts, the now outer, but for reasons of cohesion still called "inner" axes 24 are rotatably connected to the base or the object rotatably, which causes a rotation corresponding to that of FIG. 6a which can no longer take place, from the spherical movement about a virtual point which has become in this simple manner a pure rotary motion (hinge movement) about a virtual axis passing through the central point 15 and whose axis is located parallel to the inner axis 24.

A variant of the limiting device according to the invention is shown in FIG. 9. It is a kind of slide as a central part 19-20, which is connected to inner axes 24 rotatably connected to edge portions 18, 21, which in turn carry the outer axes 23, 23'; a device which kinematically performs the same as that of FIG. 4a.

If the two inner axes 24 are replaced by a fixed connection, so that in extreme cases, the edge portions 18, 21 are integrally formed with the respectively associated central part, the axes 23, 23' in their distance become variable, but are always kept parallel to each other. Thus, the exact same kinematic effect is achieved as with the device according to FIG. 4c.

FIG. 7 shows in six not further differentiated representations, the arrangement and operation of the kinematic device according to the invention, in a chair kinematic effect achieved as with the device of FIG. 4c. A base 25 is preferably height adjustable and rotatable, provided at the upper end of a support column 26. At the base 25, a pivoting device 1 is provided, the slide supports a seat surface 27 together with backrest 28, so that these two contiguous parts around the virtual central point 15 can perform a spherical movement. To limit this spherical movement, a limiting device 16 according to the invention is attached according to the limiting device shown in FIG. 4a. The outer axes 23, 23' (actually corresponding sockets or the like) are rotatably mounted on each stationary mandrels of the base 25, and the seat area 27.

With this simple measure you can reach the apparent from FIG. 7 pivotal movements, on the one hand front-rear, on the other hand left-right.

It should be pointed out here that it is of course possible to achieve by special design of the mounting of the outer axes 23 a releasable fixation of the movement in one direction, by a suitable limitation or fixation of the mobility of the inner axes 24 a releasable fixation of the movement the seat 27, with respect to the left-right movement. Such releasable fixations are known in the field of office furniture, the slide, the manipulators, and in general the automation, and are available in many different ways, so it need not be discussed in detail here. As a practical reversal of such a releasable fixation connecting one or more of the axes is to be regarded with a drive, which may for example consist of electric motor and transmission, in the form of a belt, etc., and is particularly useful in manipulators.

FIG. 8 shows here only in three representations, analogous to FIG. 7, the application of the invention in a manipulator 29 on which an object 30 is attached Here, on the one hand, the vertical normal position in FIG. 8*a* is shown, which according to (by definition) shows the front tilted position in FIG. 8*b* and the (by definition) left tilted position in FIG. 8*c*. By definition, because it depends on the viewpoint of the observer, in which direction of the object carrier 8 front and which it is laterally. From the cohesion of the three representations, the mobility and functionality of the limiting device 16 is clearly shown according to the invention, and shows the space-saving arrangement of this device.

The invention is not limited to the illustrated and described embodiments, but may be variously modified and further developed. Reference has already been made to the possibility of an installation skewed in one or both directions with respect to the internal axes and the outer axes, to provide asymmetric pivoting angles with respect to the base and the object; the formation of the limiting device in the form of the configuration of the outer components 21 in shape of universal joints was also discussed, as was the embodiment with a hinge joint, and the use of the limiting devices of FIG. 4*c* or FIG. 9.

By changing the length ratios of the individual members of the link chain 17, or their distances from inner axis to inner axis, and the outermost inner axis to the outer axis, it is possible to achieve different effects, in particular the pivotability in different directions form different sizes.

In the description and claims, as is common in this field of technology, the term "axis" is equally applied to the mathematical or technical term and the mechanical design of the necessary elements such as bearings, bushings, shafts, etc.

In the description and claims, the terms "front", "rear", "top", "bottom" and so on are used in the common form and with reference to the article in its usual position of use. That is, in a chair, the back is "back" and the seat "above" the frame, a direction which is transverse to another, essentially means a direction rotated by 90° thereto.

It should also be noted that in the description and the claims, such as "lower range" of a hanger, reactor, filter, building, chair, manipulator, or a device or, more generally, an object, the lower half and in particular the lower quarter of the total height means "lowest area" the lowest quarter and in particular an even smaller part; while "middle range" means the middle third of the total height (width–length). All this information has its usual meaning, applied to the intended position of the object under consideration.

In the description and claims, "substantially" means a deviation of up to 10% of the declared value, if it is physically possible, both downwards and upwards, otherwise only in the sensible direction, for degrees (angle and temperature) ±10° are meant.

For terms such as: "a solvent", "an axis", the word "a" or "an" is not to be regarded as a numerical word, but as an indefinite article or as a pronoun, unless the context indicates otherwise.

The term "combination" or "combinations" means, unless otherwise stated, all types of combinations, from two of the constituents concerned to a large number or all of such constituents, the term: "containing" also stands for "consisting of".

The features and variants specified in the individual embodiments and examples can be freely combined with those of the other examples and embodiments and, in particular, used to characterize the invention in the claims without necessarily provisional accompaniment of the other details of the respective embodiment or the respective example.

| Reference number list | |
|---|---|
| 1 | Swivel device |
| 2 | Base part |
| 3 | Base axis |
| 4 | Base |
| 5 | Arm axis |
| 6 | Arm |
| 7 | Object axis |
| 8 | Object carrier |
| 9 | Pivoting device |
| 10 | Base part |
| 11 | Base arm |
| 12 | Coupler |
| 13 | Object part |
| 14 | Object carrier |
| 15 | Central point |
| 16 | Limiting device |
| 17 | Link chain |
| 18 | Edge parts |
| 19 | Central parts |
| 20 | Central parts |
| 21 | Edge parts |
| 22 | Stop |
| 23 | Outer axis |
| 24 | Inner axis |
| 25 | Base |
| 26 | Column |
| 27 | Seat area |
| 28 | Backrest |
| 29 | Manipulator |
| 30 | Object |
| 31 | Pin |
| 32 | Curved recess |

What is claimed:

1. A limiting device limiting a pivot angle of a pivoting device, the pivoting device pivoting a seat of a chair about a virtual pivot point relative to a base of the chair; the limiting device including:
    a first and a second central parts; wherein:
    the first central part is directly or indirectly coupled to the base of the chair around a first inner axis;
    the second central part is directly or indirectly coupled to the seat of the chair or a carrier for the seat of the chair around a second inner axis; and
    the first and the second central parts are pivotally coupled to one another around a central inner axis that is substantially parallel to the first and second inner axes;
    wherein the limiting device is rotatably mounted on the base of the chair via a first edge part so as to rotate about a first outer axis that is substantially perpendicular to the first inner axis;

the limiting device is additionally rotatably mounted on the seat of the chair or on the carrier for the seat of the chair via a second edge part so as to rotate about a second outer axis that is substantially perpendicular to the second inner axis; and the limiting device further comprises a stop disposed on the first or the second central part, the stop being configured to limit the pivotal coupling between the first and the second central parts such that if the first and second outer axes share a common plane the limiting device prevents the first inner axis, the second inner axis, and the central inner axis from sharing a common plane.

2. The limiting device of claim 1, wherein:

the first edge part and the first central part are pivotably coupled around the first inner axis; and the second edge part and the second central part are pivotably coupled around the second inner axis;

such that the first edge part and the second edge part are mutually displaceable; where the first edge part is pivotally mounted around the first outer axis to the base of the chair, the second edge part is pivotally mounted around the second outer axis to the seat of the chair or the carrier for the seat of the chair, such that the first outer axis and the second outer axis are parallel to one another.

3. The limiting device of claim 1, wherein the first outer axis intersects with the first inner axis, and the second outer axis intersects with the second inner axis, so that each of the first edge part and the second edge part become a central member of a universal joint.

\* \* \* \* \*